(12) United States Patent
Bortnik et al.

(10) Patent No.: US 8,231,472 B2
(45) Date of Patent: *Jul. 31, 2012

(54) UBIQUITOUS UNIFIED PLAYER IDENTITY TRACKING SYSTEM

(75) Inventors: Michal Bortnik, Seattle, WA (US); Erik John Arthur, Redmond, WA (US); James David Macauley, Bellevue, WA (US); Ling Tony Chen, Bellevue, WA (US); Yasser B. Asmi, Redmond, WA (US); Steven D. Lamb, Woodinville, WA (US); James N. Helm, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/240,454

(22) Filed: Sep. 22, 2011

(65) Prior Publication Data

US 2012/0009999 A1 Jan. 12, 2012

Related U.S. Application Data

(63) Continuation of application No. 12/916,246, filed on Oct. 29, 2010, which is a continuation of application No. 12/578,605, filed on Oct. 14, 2009, now Pat. No. 7,837,561, which is a continuation of application No. 11/006,275, filed on Dec. 7, 2004, now Pat. No. 7,621,813.

(51) Int. Cl.
*G06F 17/00* (2006.01)
*G06F 19/00* (2006.01)
*A63F 9/24* (2006.01)
*A63F 13/00* (2006.01)

(52) U.S. Cl. ............... 463/42; 463/1; 463/29; 463/40

(58) Field of Classification Search ............... 463/1, 29, 463/40–43
See application file for complete search history.

(56) References Cited

U.S. PATENT DOCUMENTS

| | | | |
|---|---|---|---|
| 6,280,328 B1 * | 8/2001 | Holch et al. ................... 463/42 |
| 6,302,793 B1 * | 10/2001 | Fertitta et al. ................. 463/25 |
| 6,312,336 B1 * | 11/2001 | Handelman et al. ........... 463/40 |
| 6,352,479 B1 * | 3/2002 | Sparks, II ...................... 463/42 |
| 6,645,068 B1 * | 11/2003 | Petermeier et al. ............. 463/9 |
| 6,755,743 B1 * | 6/2004 | Yamashita et al. ............. 463/42 |
| 6,821,205 B2 * | 11/2004 | Takahashi et al. ............. 463/42 |
| 7,035,653 B2 * | 4/2006 | Simon et al. .................. 455/466 |
| 7,086,946 B2 * | 8/2006 | Yoshida ......................... 463/23 |
| 7,240,093 B1 * | 7/2007 | Danieli et al. ................ 709/205 |
| 7,621,813 B2 * | 11/2009 | Bortnik et al. ................. 463/42 |
| 7,837,561 B2 * | 11/2010 | Bortnik et al. ................. 463/42 |
| 2002/0049507 A1 * | 4/2002 | Hameen-Anttila ............ 700/92 |
| 2002/0083145 A1 * | 6/2002 | Perinpanathan .............. 709/213 |
| 2002/0090996 A1 * | 7/2002 | Maehiro ......................... 463/42 |
| 2002/0142842 A1 * | 10/2002 | Easley et al. ................... 463/42 |
| 2003/0045358 A1 * | 3/2003 | Leen et al. ..................... 463/42 |

(Continued)

*Primary Examiner* — Milap Shah
(74) *Attorney, Agent, or Firm* — Alleman Hall McCoy Russell & Tuttle LLP

(57) ABSTRACT

Systems and method for providing a single sign in a gaming console that associates online activity that is out-of-game/cross game, and/or online activity that is in-game, and/or activity that is offline and in-game with that account. While online, a service tracks activity of gamers and provides usage statistics in a profile. While offline, the game console tracks the player's activity via a mechanism to collect detailed information about a specific player's in-game statistics and accomplishments. The offline activity is cached and uploaded when the console connects to the online service. Players can accumulate achievements offline that are credited towards online activities.

18 Claims, 7 Drawing Sheets

U.S. PATENT DOCUMENTS

| | | | |
|---|---|---|---|
| 2003/0050115 A1* | 3/2003 | Leen et al. | 463/29 |
| 2003/0100363 A1* | 5/2003 | Ali | 463/30 |
| 2003/0104868 A1* | 6/2003 | Okita et al. | 463/42 |
| 2004/0087373 A1* | 5/2004 | Choi | 463/42 |
| 2004/0225386 A1* | 11/2004 | Thompson et al. | 700/92 |
| 2004/0259641 A1* | 12/2004 | Ho | 463/42 |
| 2005/0137014 A1* | 6/2005 | Vetelainen | 463/42 |
| 2005/0209002 A1* | 9/2005 | Blythe et al. | 463/42 |
| 2006/0052168 A1* | 3/2006 | Shacham | 463/42 |
| 2006/0121991 A1* | 6/2006 | Borinik et al. | 463/43 |
| 2006/0122716 A1* | 6/2006 | Bortnik et al. | 700/91 |
| 2006/0172799 A1* | 8/2006 | Kane et al. | 463/25 |
| 2006/0258463 A1* | 11/2006 | Cugno et al. | 463/42 |
| 2007/0117629 A1* | 5/2007 | Fowler et al. | 463/42 |
| 2007/0173321 A1* | 7/2007 | Shen et al. | 463/40 |
| 2007/0173327 A1* | 7/2007 | Kilgore et al. | 463/42 |

* cited by examiner

UBIQUITOUS UNIFIED PLAYER IDENTITY TRACKING SYSTEM

RELATED APPLICATIONS

The present application is a continuation of U.S. patent application Ser. No. 12/916,246 filed Oct. 29, 2010 entitled "UBIQUITOUS UNIFIED PLAYER IDENTITY TRACKING SYSTEM," which is a continuation of U.S. patent application Ser. No. 12/578,605, filed on Oct. 14, 2009, entitled "UBIQUITOUS UNIFIED PLAYER IDENTITY TRACKING SYSTEM," which is a continuation of U.S. patent application Ser. No. 11/006,275, filed on Dec. 7, 2004, entitled "UBIQUITOUS UNIFIED PLAYER IDENTITY TRACKING SYSTEM," the entire contents of each of which is hereby incorporated by reference.

COPYRIGHT NOTICE/PERMISSION

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings hereto: Copyright© 2004, Microsoft Corporation, All Rights Reserved.

FIELD OF THE INVENTION

This invention generally relates to the field of gaming and multimedia devices. In particular, the present invention is directed to a system and method of creating and tracking unique gaming identity across multiple contexts.

BACKGROUND OF THE INVENTION

Conventional gaming systems include a concept of unique identity, which was intended to increase player satisfaction and create a sense of community. However, while the conventional unique identity does minimize the effort required to play online, the unique identity failed to accomplish these goals. One reason for this problem is that multiple players often share an identity because there is no easy way for multiple players to identify themselves on a shared gaming device. This creates confusion as a player using a particular identity during an online gaming session, may not be the same player in the next session or from the previous session.

Further, conventional identities have failed to provide a method for conveying information about players other than a limited set of game achievements and fail to convey information about offline achievements. Thus, it is difficult to learn more about a player through the conventional unique identity. Therefore, there is a need for a unique identity that is rich and includes information from both offline and online contexts. The present invention provides such a solution.

SUMMARY OF THE INVENTION

The present invention is direct to a systems and methods for providing a single sign in a gaming console that associates online activity that is out-of-game/cross game, and/or online activity that is in-game, and/or activity that is offline and in-game with that account. While online, a service tracks activity of gamers and provides usage statistics in a profile. While offline, the game console tracks the player's activity via a mechanism to collect detailed information about a specific player's in-game statistics and accomplishments. The offline activity is cached and uploaded when the console connects to the online service. Players can accumulate achievements offline that are credited towards online activities. In addition to learning about other players, the present invention allows all players, online and offline, to personalize their gaming experience by specifying global settings, such as controller vibration, that apply to all games on the system. This eliminates the need to customize each game individually.

In accordance with an aspect of the invention, there is provided a method of providing a unique player identity that extends across multiple contexts. The method includes providing a sign in mechanism where users access the gaming console via a profile associated with the unique player identity; storing settings in accordance with the profile; associating the profile with an offline account; tracking user activity within the offline account; and attributing the user activity to the profile.

In accordance with a feature of the invention, an in-game profile may be associated with the profile. Settings may be applied in accordance with the in-game profile to game preferences and controllers In accordance with another feature, an online service may be associated with the profile. Online user activity may be tracked and attributed to the profile. Further, offline user activity may be cached and synchronizing to the profile such that the profile reflects both the offline and the online user activity.

In accordance with another aspect of the invention, a system for providing a unique player identity that extends across multiple contexts is made available. The system includes an online service that tracks online player activity in a profile associated with the unique player identity, and a gaming console that tracks offline player activity in the profile. The console provides a sign in mechanism wherein users access the gaming console via the profile, and settings and preferences are stored in the profile.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIGS. 5-11 illustrate exemplary user interfaces for creating, accessing and using the unified player identity via a single sign in.

DETAILED DESCRIPTION OF ILLUSTRATIVE EMBODIMENTS

Figure 1:
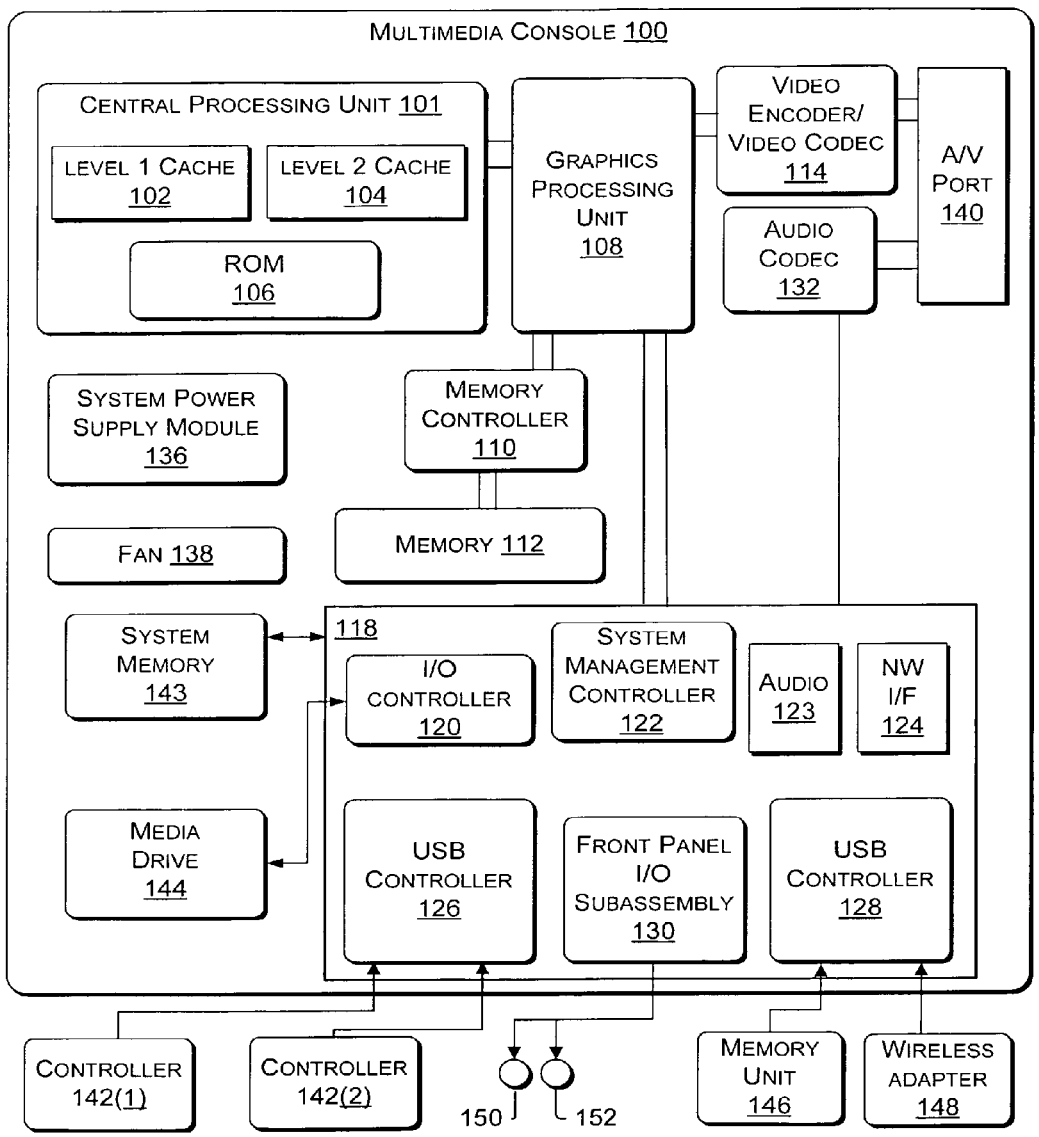
FIG. 1 is a block diagram showing a gaming console in which aspects of the present invention may be implemented.

FIG. 1 illustrates the functional components of a multimedia/gaming console 100 in which certain aspects of the present invention may be implemented. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches.

The present invention is directed to a "Gamer Profile," which serves as a building block for services and applications that aim to create a social community of gamers and grow relationships among players. In accordance with the present invention, the Gamer Profile is the entirety of information (e.g., metadata) related to a specific user (i.e., the gamer's digital identity). The Gamer Profile is developed from a set of services that collect and expose this information in a meaningful way to the community. The Gamer Profile also provides for personalization such that users can customize and enhance their gaming experience. As will be discussed in greater detail below, the Gamer Profile consists of various components, including, but not limited to, a Gamercard, game achievements, and gamer preferences.

Figure 2:
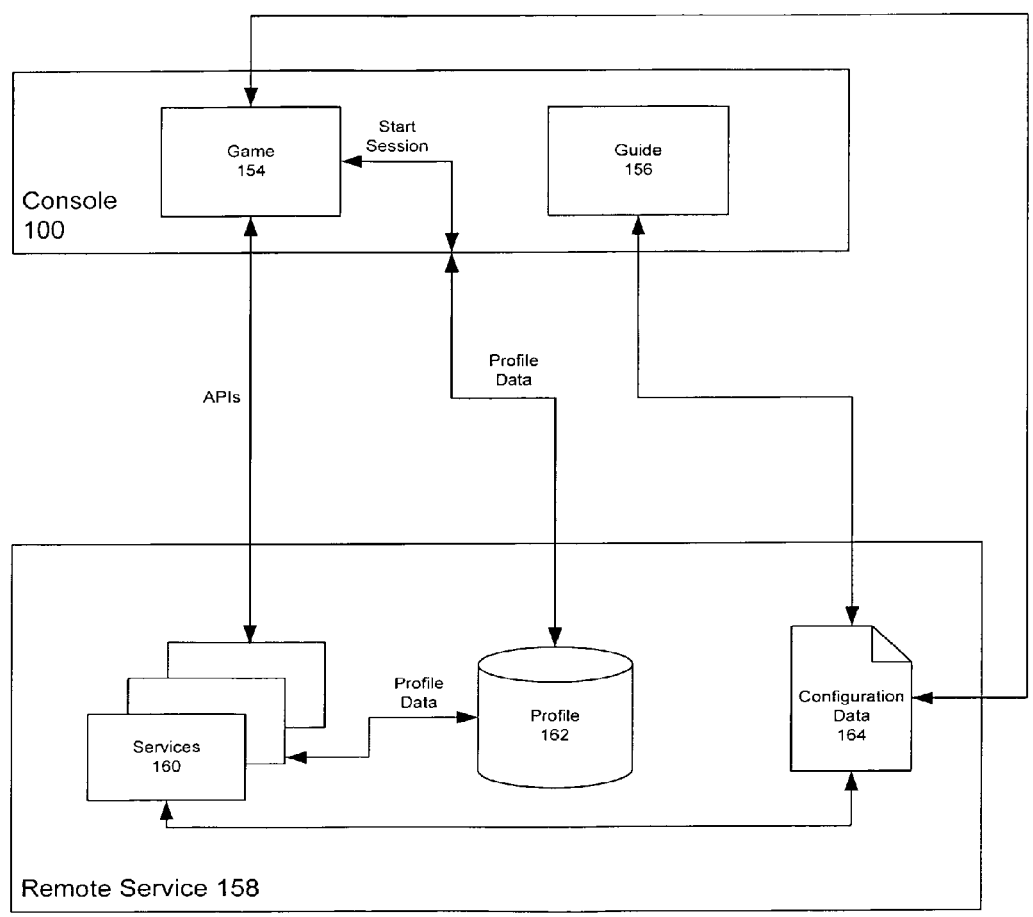
FIG. 2 illustrates an exemplary architecture in which the present invention may be implemented.

Referring to FIG. 2, there is illustrated an overview of an exemplary architecture that may be used to implement the Gamer Profile. The console 100 interacts with a remote service 158 that provides services 160 such as voice/chat, a friends list, matchmaking, content download, roaming, feedback, tournaments, voice messaging, and updates to gamers. The service 158 also maintains the Gamer Profiles in a profile database 162 and configuration data 164 used by the services 160 and games 154. The service 158 collects Gamer Profiles, aggregates, processes information supplied by other services 160, and fulfills real-time client requests for retrieving Gamer Profile-related services. The Gamer Profiles in the database 162 are also used by the games 154 to enable, among other things, personalization and customization, etc.

Using the console 100, the user may interact with a guide 156. The guide 156 provides an interface where the user may navigate to, and enter, various online areas and options provided by the service 158. The configuration data 164 stored by the service 158 may be used to determine features and options provided by the guide 156. When the game 154 is running, a defined set of APIs are used to call and interact with the services 160. When requesting Gamer Profile information via the APIs, the game 154 may pass a unique identifier of a user. The service 158 may return a Gamercard (discussed below), game stats, game achievements, affiliations, game settings, etc. Additional details of the various aspects of the exemplary architecture are provided below.

Figure 3:
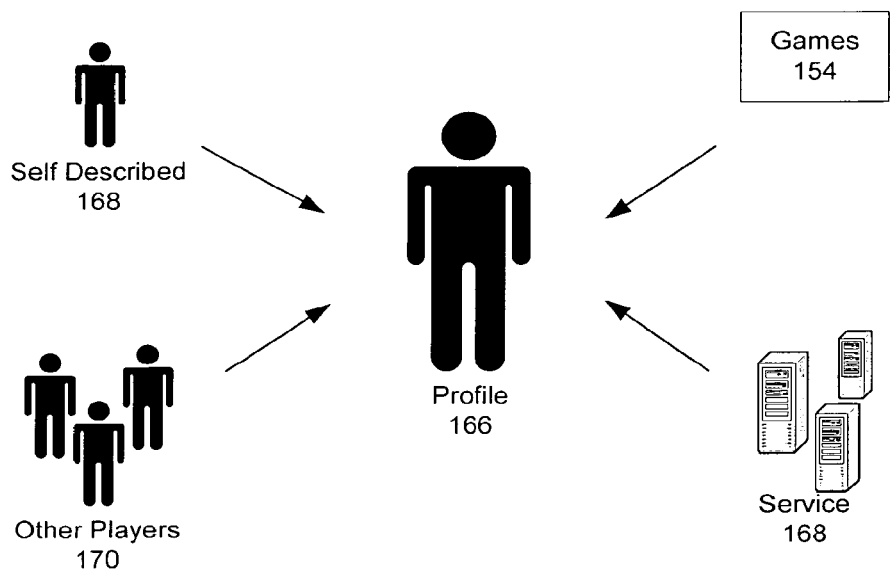
FIG. 3 illustrates sources of information that provide input to a Gamer Profile.

Referring to FIG. 3, the Gamer Profile 166 is created when a user creates a profile (selected from the guide 156) and chooses his/her unique Gamertag (a user's unique name), tile (picture/avatar associated with the user) other options during an account sign-up phase. From there, a base Gamer Profile 166 is created. The Gamer Profile 166 may then be populated from several sources. For example, the Gamer Profile 166 may include self-described data 168 from the Gamer Profile owner. Other gamers 170 can provide feedback regarding the Gamer Profile owner. The service 158 may track the gamer's online and offline activity. In addition, the games 154 may report the gamer's statistics and game achievements.

The owner of Gamer Profile can edit his/her Gamer Profile 166 directly and control who can view each section of the Gamer Profile. The Gamer Profile 166 may be edited via general fields (e.g., tile, country, language, gender, greeting, etc.) and/or system settings (e.g., voice output, controller vibration, character name, game format, game mode, etc.). Privacy/Opt-out Settings can be tuned for the Gamer Profile to, e.g., restrict presence information only to friends, allow game achievements to be visible to all, etc.

The Gamer Profile 166 may include feedback provided by other players 170. Feedback helps others learn about a particular gamer. For example, if the gamer uses foul language or aggressive play in game sessions, other gamers may submit feedback to the service 158. The feedback mechanism improves the user experience by building reputations. Players are therefore anonymous, but not unknown because of the accumulated feedback.

As noted above the Gamer Profile 166 may be used for customization and preference setting on a global level, as well as a per game level. Gamer preferences aid games 154 in choosing defaults for common settings such as game profile name, controller inversion and controller vibration, etc. For example, if a gamer likes using an inverted controller, this preference will be used for new titles as they are played. Games 154 have access to Gamer Profiles via the database 162 and services 160. In addition, game usage data can be mined to tune the game 154 to the user's particular preferences and game features updated after the initial game launch.

Figure 4:
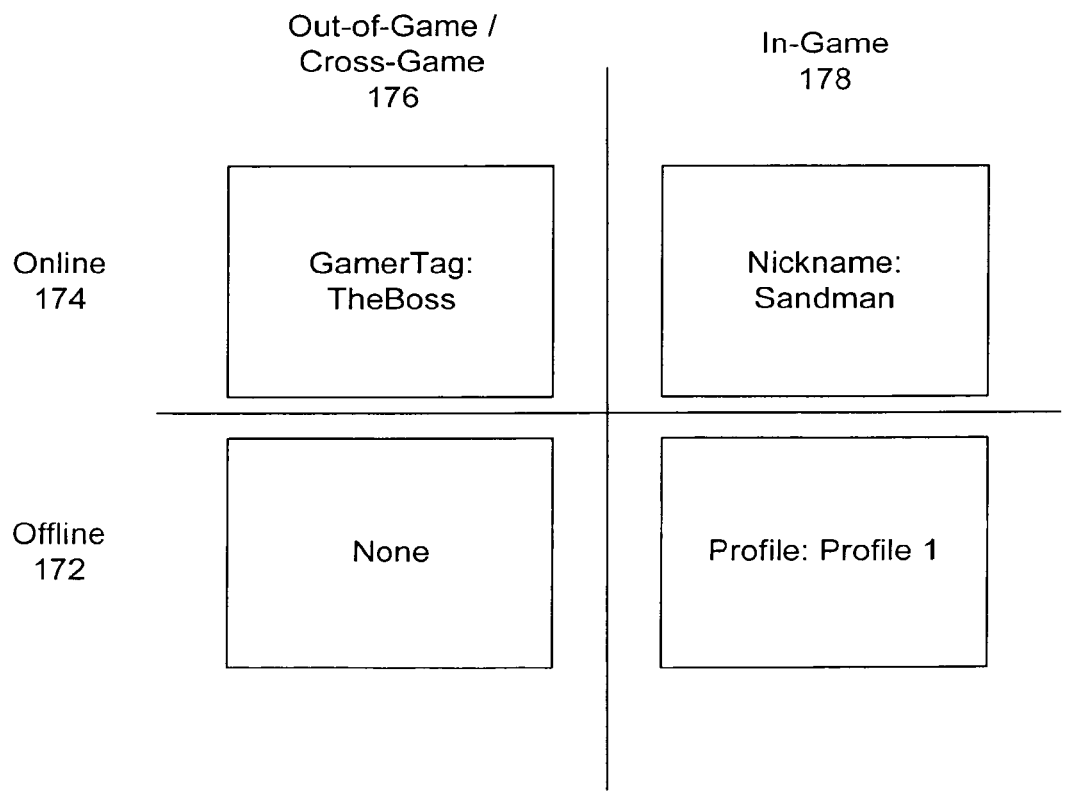
FIG. 4 illustrates the contexts over which the present invention operates to maintain a unified player identity.

In another aspect of the invention, a unified sign-in is provided as part of a ubiquitous identity that extends across multiple contexts, thus enabling a consistent player identity offline and online. Referring to FIG. 4, there are illustrated the contexts over which the present invention operates—offline 172, online 174, out-of-game/cross-game 176, and in-game 178, which represents a convention console environment. The unified sign-in, combined with a mechanism for tracking offline player activity, advantageously eliminates the problems in conventional consoles where players must juggle between profiles and accounts, sharing them with other players, and are unable to accumulated game achievements while playing offline.

In addition, the present invention allows a player to create the in-game profile, such that default options and information (e.g., name, controller settings, etc.) are automatically set. The in-game profiles may be automatically associated with offline accounts so each time a player plays a game, the profile is selected based on the offline account. This minimizes the configuring and tweaking necessary for a player to get started in a new game or to continue in an old game after signing in.

In accordance with the present invention, a player may sign-in under a single account that associates online activity that is out-of-game/cross game, and/or online activity that is in-game, and/or activity that is offline and in-game with that account, and/or offline out-of-game use. While online, the service 158, games 154 and console 100 track activity of gamers and provide usage statistics in the Gamer Profile 166. While offline, the game console 100 and games 154 track the gamer's activity via a mechanism for instrumenting games to collect detailed information about a specific player's in-game statistics and accomplishments.

The offline mechanism of the present invention provides several functionalities. The first is caching and uploading achievements when an offline account is enabled for an online account with the service 158. This allows players who have been using their offline accounts to upload achievements collected offline to their Gamer Profile 166. This way, players can accumulate achievements offline that are credited towards online activities, e.g., tournaments, etc. that require high levels of achievements. The second functionality is caching and uploading achievements after playing offline. Players can play games on the console 100 anywhere, any time, and the statistics and achievements are updated to the service 158 to reflect the play. This functionality also operates for new games that have yet to be played online. The Gamer Profile 166 is updated during the next connection to the service 158 to reflect the offline play.

A third functionality of the offline mechanism is caching and uploading achievements after a connectivity failure (e.g., an offline synchronization). At first, players may be hesitant to use a wireless router for online play because of dropped connections. Because the present invention caches the statistics during transient connectivity problems, achievements are updated online even if there are network problems. Additional functionalities may include viewing offline achievements when signed-in online, or while offline, etc.

Figure 5:
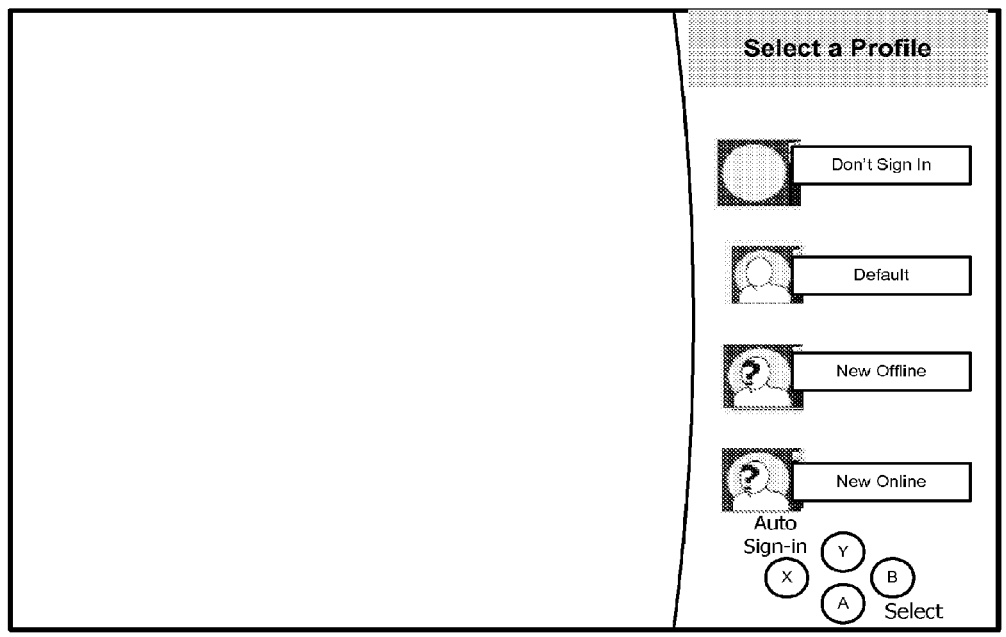

The process for creating and using a single sign in and offline accounts will now be described. Referring to FIG. 5, the first time a player plays on the console 100, she may select to create a new offline or online profile. If the user selects an offline profile, the new user may create an account using a GamerTag whereby default settings are applied. After the offline account is created, in-game profiles, game saves and game achievements are organized and associated with the account. She may also choose default game settings, such as vibration OFF and inverter controls ON at this time.

When players sign-up for an online account with the service 158 using the interface of FIG. 5, it may be possible that the GamerTag they selected for their offline account is already taken. Therefore, they must change their GamerTag for the new online account. If they accept the change, the offline account GamerTag renamed to the new GamerTag. Any accumulated offline achievements will be credited to the new online account so experienced players do not have to "start over" to show others online that they are worthy players.

Figure 6:
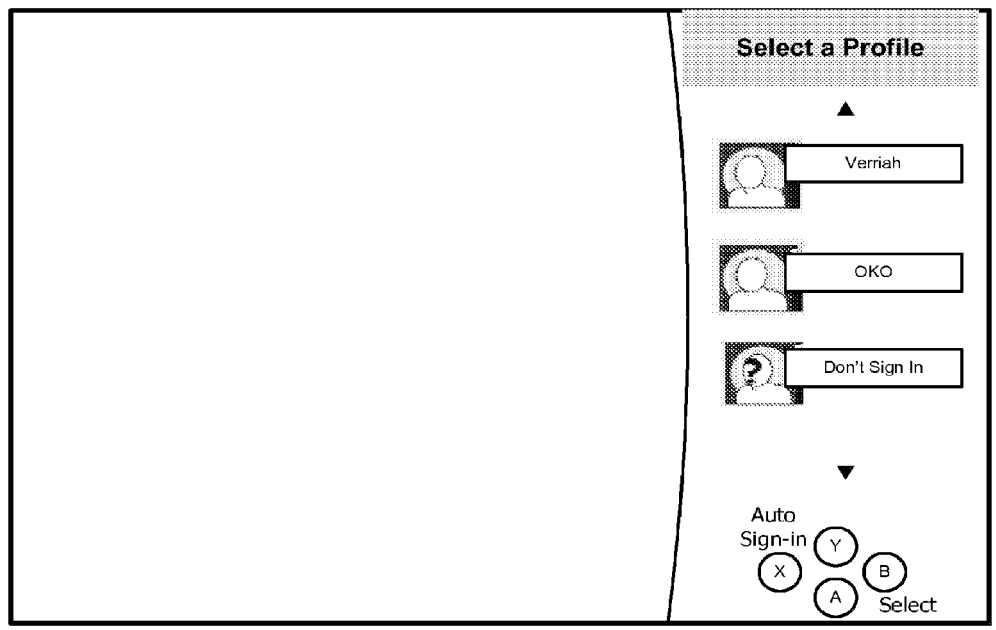
Figure 7:
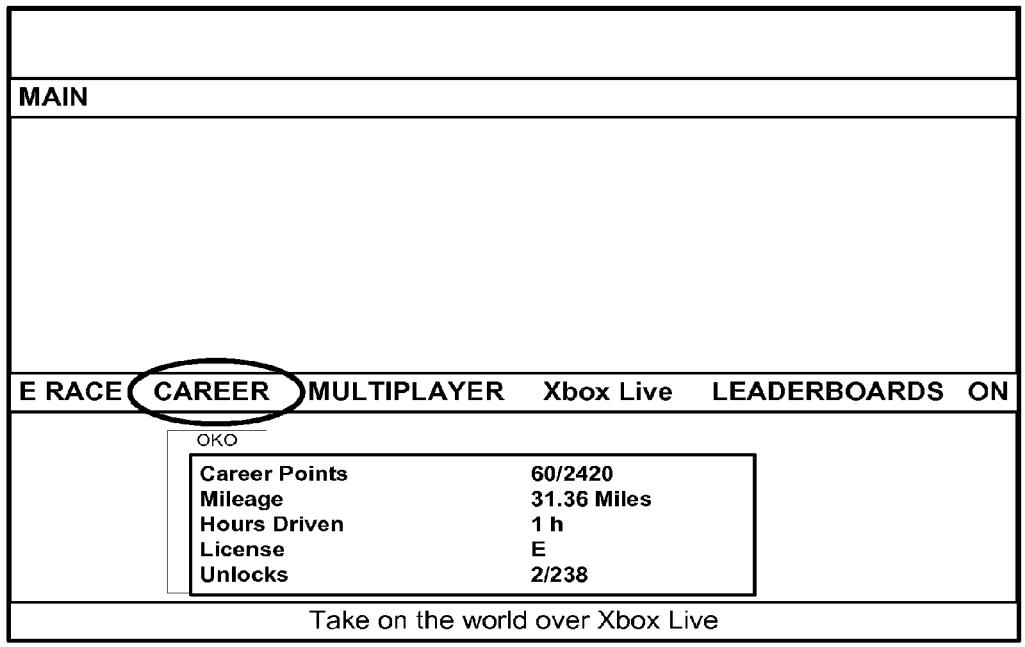
Figure 8:
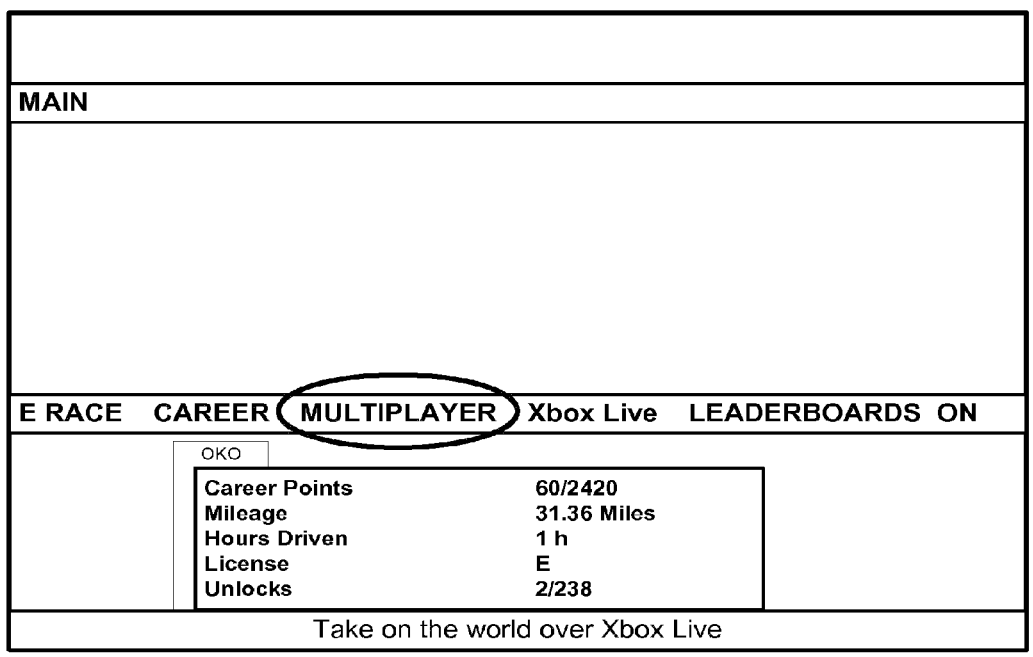

After an account is created (e.g., OKO), the user may select the account as the default. The console 100 may automatically sign in the user when the game boots and provide a pop-up message such as "Welcome back, OKO (Press a button to sign-in somebody else)," require the user to select the default account as shown in FIG. 5, or provide a list of profiles to select from (FIG. 6). After the user signs in, a main screen may be shown (FIGS. 7-8) that allows the user to select information related to the profile, gaming play, or other options. In the context of a racing game, statistics such as total points, mileage, hours driven, license, unlocks may be shown after the profile is selected.

The offline account may be stored on the memory unit 146 so may be transported from one console 100 to another. This is advantageous, for example, if the player would like to play in a local tournament, where she can bring her memory unit 146 with her offline account and in-game profile on it. Since the player has most likely spent a great amount of time tweaking the profile, it is preferable to bring the memory unit 146, rather than re-create the profile.

Figure 9:
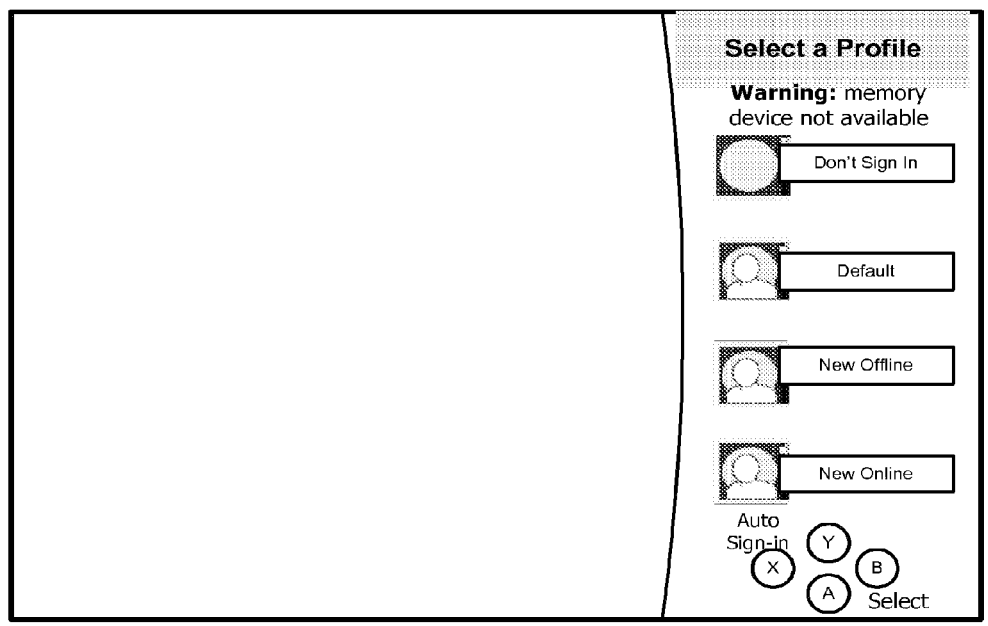
Figure 10:
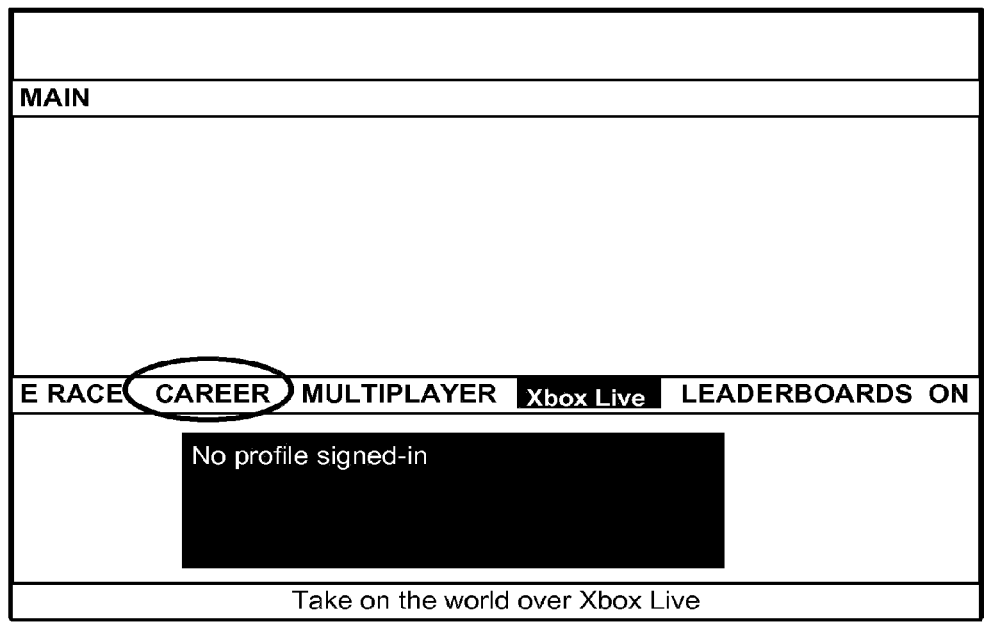
Figure 11:
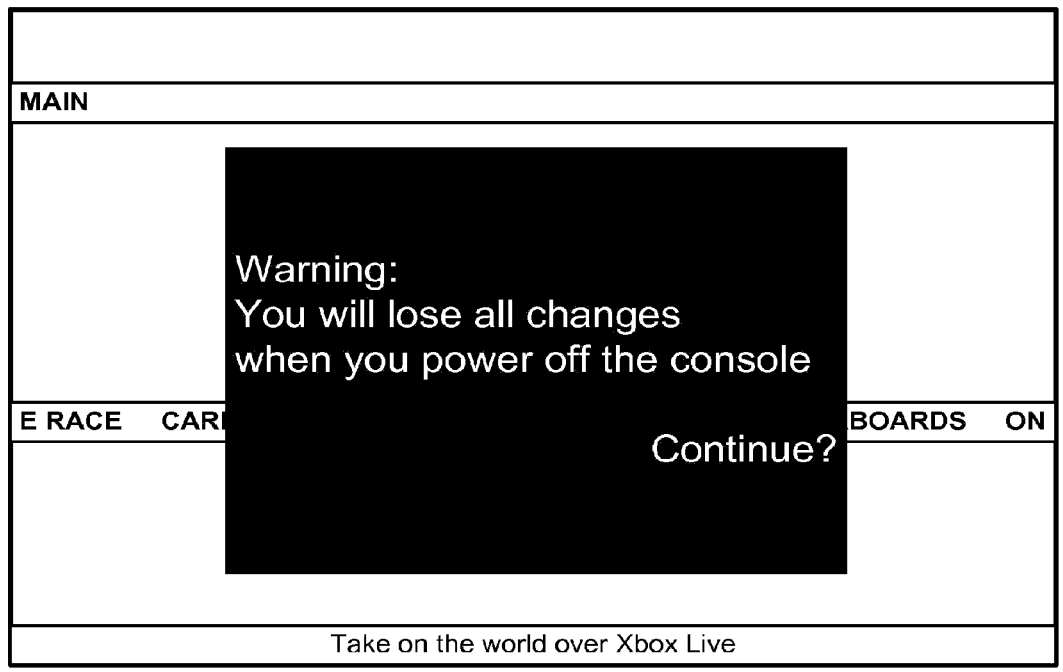

Players should be notified if a memory unit 146 is not available so game play statistics and settings are not lost. Referring to FIGS. 9-11, there is illustrated exemplary user interfaces on the console 100 that reflect this condition. If the user begins game play without signing in, the main screen (FIG. 10) displays a message under the career statistics that the user is not signed in and the user is warned when powering off the console that all changes will be lost (FIG. 11).

While the present invention has been described in connection with the preferred embodiments of the various Figs., it is to be understood that other similar embodiments may be used or modifications and additions may be made to the described embodiment for performing the same function of the present invention without deviating therefrom.

The invention claimed is:

1. A method of communication between a gaming application and a remote service executed by a server computing device, the method comprising, at an application programming interface executed on a multimedia device:

receiving, from a gaming application, data indicating that a plurality of achievements associated with user activity occurring during execution of the gaming application were earned when the gaming application was not connected to the remote service;

storing the data in a local memory of the multimedia device; and transmitting, after the execution and conclusion of a game associated the gaming application, to the remote service when the gaming application establishes a connection with the remote service, the data indicating that the plurality of achievements associated with user activity occurring during the execution of the gaming application were earned, when the gaming application was not connected to the remote service.

2. The method of claim 1, further comprising, at the multimedia device:

providing access via the remote service to a profile associated with the user, the profile including the data and a username.

3. The method of claim 2, where the profile further includes in-game statistics and affiliations of the user.

4. The method of claim 2, where the profile further includes settings for game preferences, the method further comprising applying said settings to game preferences in accordance with said profile for the user.

5. The method of claim 2, further comprising, at the multimedia device:

associating an online service at the remote service with said profile;

tracking online user activity, the online user activity occurring when the gaming application is connected to the remote service; and attributing the online user activity to the profile.

6. The method of claim 5, further comprising, at the multimedia device:

synchronizing offline user activity to the profile such that the profile reflects both the offline and online user activity, the offline user activity occurring when the gaming application is not connected to the remote service.

7. The method of claim 1, wherein the multimedia device is a gaming console.

8. A multimedia device comprising a processor and associated memory, the processor being configured to execute an application programming interface, the application programming interface being configured to:

receive, from a gaming application, data indicating that a plurality of achievements associated with user activity occurring during execution of the gaming application were earned when the gaming application was not connected to a remote service executed on a remote server;

store the data in a local memory of the multimedia device; and transmit, after the execution and conclusion of a game associated with the gaming application, to the remote service executed on the remote server, when the gaming application establishes a connection with the remote service, the data indicating that the plurality of achievements associated with user activity occurring during the execution of the gaming application were earned when the gaming application was not connected to the remote service.

9. The multimedia device of claim 8, where the application programming interface is further configured to provide access via the remote service to a profile associated with a user, the profile including the data and a username.

10. The multimedia device of claim 9, where the profile further includes in-game statistics and affiliations of the user.

11. The multimedia device of claim 9, where the profile further includes settings, the method further comprising applying said settings to game preferences in accordance with said profile for the user.

12. The multimedia device of claim 9, wherein the application programming interface is further configured to:
associate an online service at the remote service with said profile;
track online user activity, the online user activity occurring when the gaming application is connected to the remote service; and
attribute the online user activity to the profile.

13. The multimedia device of claim 12, wherein the application programming interface is further configured to:
synchronize offline user activity to the profile such that the profile reflects both the offline and online user activity, the offline user activity occurring when the gaming application is not connected to the remote service.

14. The multimedia device of claim 8, wherein the multimedia device is a gaming console.

15. A method of communication between a multimedia device and a remote service executed by a server computing device, said method comprising, at the multimedia device:
receiving a credential associated with a user profile, the user profile including a plurality of achievements earned by a user during execution of a gaming application on the multimedia device while the multimedia device is not connected to the remote service, and were uploaded to the remote service after execution and conclusion of a game associated with the gaming application while the multimedia device is connected to the remote service;
logging the user onto the remote service to access the user profile by validating the credential;
receiving, from the remote service, data indicating the plurality of achievements earned by the user and uploaded to the remote service; and
providing a guide for the user to view the earned achievements that have been uploaded.

16. The method of claim 15, where the multimedia device is a gaming console.

17. The method of claim 15, further comprising displaying the profile in the guide, the displayed profile including earned achievements earned during offline user activity while the multimedia device was not connected to the remote service.

18. The method of claim 17, where the displayed profile further includes earned achievements earned during online user activity while the multimedia device was connected to the remote service.

* * * * *